United States Patent [19]

Altmann et al.

[11] Patent Number: 4,695,091
[45] Date of Patent: Sep. 22, 1987

[54] HEAT CONDUCTOR CONNECTIONS BETWEEN SEATS AND BACKRESTS OF VEHICLES

[75] Inventors: Horst-Dieter Altmann, Gründau-Lieblos; Eberhard Haupt, Gründau-Rothenbergen, both of Fed. Rep. of Germany

[73] Assignee: I.G. Bauerhin GmbH Elektro-Technische Fabrik, Gründau-Rothenbergen, Fed. Rep. of Germany

[21] Appl. No.: 932,292

[22] Filed: Nov. 19, 1986

[30] Foreign Application Priority Data

Dec. 17, 1985 [DE] Fed. Rep. of Germany ....... 3544499

[51] Int. Cl.$^4$ .............................................. A47C 7/72
[52] U.S. Cl. .................................. 297/180; 297/229; 219/528
[58] Field of Search ............... 297/180, 230, 231, 229, 297/219; 219/217, 528

[56] References Cited

U.S. PATENT DOCUMENTS

| | | | |
|---|---|---|---|
| 3,017,493 | 1/1962 | Cooke | 219/217 X |
| 3,136,577 | 6/1964 | Richard | 297/180 |
| 3,344,385 | 9/1967 | Bartos et al. | 219/528 X |
| 4,063,069 | 12/1977 | Peeri | 219/217 X |
| 4,413,857 | 11/1983 | Hayashi | 297/180 |

Primary Examiner—Francis K. Zugel
Attorney, Agent, or Firm—Quaintance, Murphy & Presta

[57] ABSTRACT

The invention relates to a heating conductor connection between electrically heated seat and backrest surfaces separated by a bracing trough provided in the padding core. Beneath the bracing trough a bracing wire is bonded in the padding core and a connecting seam of the covering materials is located in the bracing trough. A further bracing wire which is disposed in an apron formed by an insert loop is provided, the two bracing wires being connected via clamping clips.

The heated separate surfaces are formed by the heating conductor connections crossing through the bracing trough. These connections take up the mechanical stresses by tension, compression and bending without being endangered.

According to the present invention, connecting webs (4.0) of copper strip (4.1), are provided between the heated surfaces (2 and 3) and the copper strip (4.1) consists of woven or knitted material. The connecting heating conductor section (4.2) is laid in meander or wave form, bearing on the copper strip (4.1) thus formed.

A further embodiment provides that the connecting web (4.0) consists of a two-layer copper strip (4.1) and the heating conductor (4.2) is led in meanders and is freely movable between the two layers.

4 Claims, 4 Drawing Figures

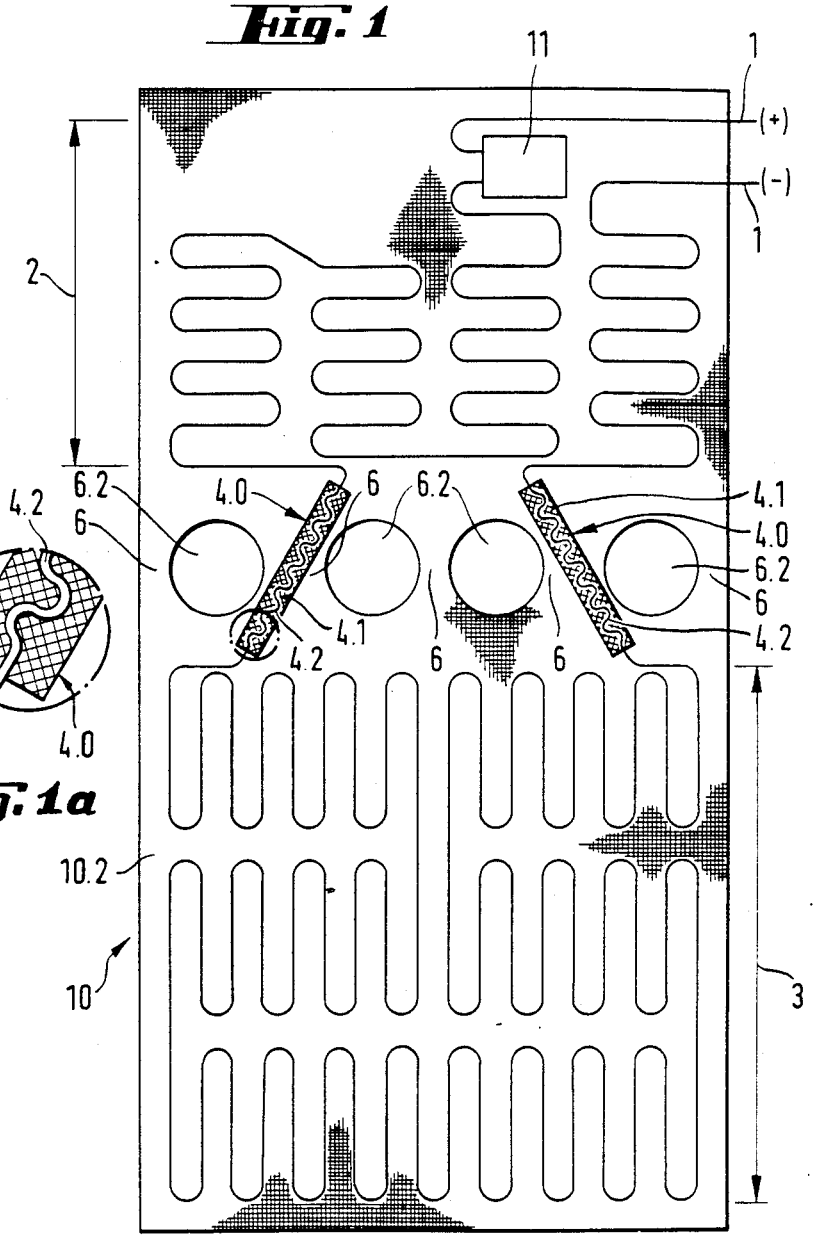

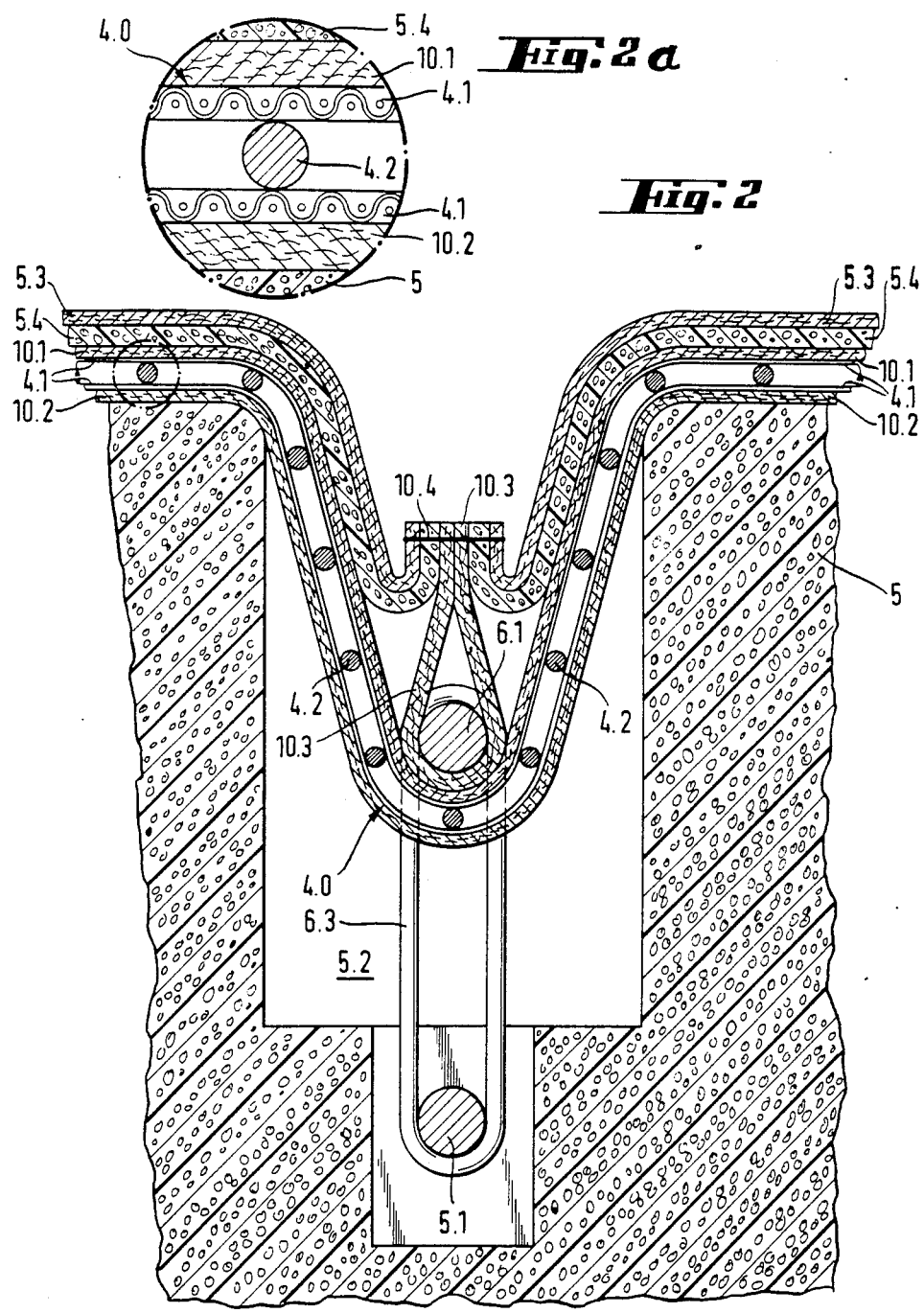

HEAT CONDUCTOR CONNECTIONS BETWEEN SEATS AND BACKRESTS OF VEHICLES

CROSS REFERENCE TO A RELATED APPLICATION

Applicants claim priority under 35 USC 119 for application No. P 35 44 499.1, filed Dec. 17, 1985, in West Germany.

BACKGROUND OF THE INVENTION

The field of invention is seats and chairs with heat exchange and the invention is particularly concerned with a heating conductor connection between electrically heated seat and backrest surfaces. The seat and backrest are separated by a bracing trough provided in the padding, core and beneath the bracing trough a bracing wire is provided which is bonded into the padding core. The bracing wire is exposed in sections by window-like recesses in the bracing trough, and, furthermore, the connecting seam of the covering materials (textile, leather or plastic) are likewise provided in the bracing trough. The covering materials include an apron which is formed by an insert loop and which receives a further bracing wire, for heating the seats of vehicles.

The prior art electrical connections between two or more heated surfaces of a vehicle seat are particularly liable to break under tensile, compressive and bending stresses.

In addition, between the heated surfaces, as mentioned a bracing trough or pit, i.e. a depression, is disposed in which a bracing apron connected to the covering material is arranged, this apron serving to secure and tension the cover over a bracing wire introduced into the apron.

This upper bracing wire is connected by clips through cutouts in the seat core to a second bracing wire embedded in the seat core.

There is a danger in this prior art solution that in the region of the heating conductor connection between the otherwise separate heating faces local overheating of the heating conductors occurs. This overheating leads to damage and destruction of the insulation and scaling of the fine heating conductor stranded wire which then in conjunction with the afore-mentioned possible mechanical stresses finally leads to breakage of the individual wires.

The resulting reduction of the heating conductor crosssection leads to a further increase in the local overheating so that the heating conductor finally burns through completely and usually leaves a visible scorched area.

Various attempts have been made to eliminate this source of danger. Thus, for example, in some cases a lateral bypassing of the bracing point is used. This is, however, usually not possible because such a procedure does not permit the formation of exact edge borders of the heating surfaces.

A prior art construction similar to this lateral bypass construction is described by German Utility Model No. 81 37 914.5. This connecting means between several surface heating element sections aims at avoiding the danger due to mechanical stresses by forming a connection which includes between the connection points of the individual surface heating sections multicore conductor stranded wires laid in waves. The conductor stranded wires are connected to the terminal wires on both sides by crimped sleeves so that the terminal wires, each surrounded by the conductor cores, are pressed into the crimped sleeve.

The use of a conductor stranded wire which is thick and flexible enough to stand up to the mechanical requirements avoids, due to its large cross-section, the danger of local overheating.

Fundamentally, however, this connection has the disadvantage that the heating conductor must be interrupted and in each case two connection points arise for heating the wire-conductor stranded wire. When these connections lie in the heating surface they form hard points which can be seen in the covering material disposed thereabove, and can be felt therethrough. This is particularly true with leather and velour.

When these prior art connections are accommodated in the bracing troughs they are subjected to an increased mechanical stress which can easily lead to tearing of heating conductors because of their stiffness.

It has been found in practice that the connection of a thin wire cross-section to the cross-section of a stranded wire several times thicker is always problematical.

In addition, the laying within the bracing trough always requires great care which cannot usually be assumed in the assembly of vehicle seats carried out at piece rate.

SUMMARY OF THE INVENTION

Having in mind the limitations of the prior art it is an object of the present invention to provide a heating conductor connection of the type described at the beginning which without separation of the heating conductor in the region of the bracing trough permits reliable tension-free laying thereof.

This object is achieved by providing that between the heated surfaces connecting webs of copper strip are provided and the copper strip consists of a woven or knitted material, the connecting heating conductor section, laid in meander or wave form, bearing on the copper strip thus formed. The woven or knitted copper strip has the tradename "Cu-Geflechtsband".

By providing a heating conductor section laid in meander or wave form between two layers of a copper strip made from thin wires mechanical stresses are reduced to a minimum approaching zero and the heating conductor section is no longer endangered.

According to a further embodiment the connecting web consists of a two-layer copper strip and the heating conductor led in meanders is arranged freely movable between the two layers.

By embedding the heating conductor between two layers of the copper strip an additional protection of the heating conductor section is obtained because a direct obstructing of the freedom of movement by the easily impressed textile material is prevented.

A further embodiment includes laying out the connecting webs in the region of the edge boundaries of the heated surfaces at an angle between 30° and 60° laterally inverted with respect to each other and matched in their length such that the ends of the connecting webs engage at least about 20 mm on both sides of the bracing trough into the heated surfaces to be connected.

By laying out the connecting webs laid at an angle between 30° and 60°, laterally inverted with respect to each other the free length thereof available for changes in shape is increased so that a further reduction of the danger of breakage is achieved.

The angular arrangement of the connecting webs which, considered in the extension and referred to as V-shaped, stabilizes the position of the two heated surfaces with respect to each other.

Furthermore, by the engagement of the connecting webs into the heating surfaces their connection contact is additionally ensured.

This construction of the heating conductor connection or the supporting on the padding core not only ensures a fixed attachment thereof, i.e., a practically slip-free connection, but in addition ensures a simple rapid assembly of the heating surfaces with exact bordering of the bracing trough.

Moreover, the heat buildup occurring in the bracing trough is dissipated through the copper strip into the heating surfaces.

It is further provided that the heating conductor bearing on the connecting web and laid in wave or meander form is fixed at least at its reversal points to be frictionally displaceable and that the heating conductor has a non-adhering coating and that the non-adhering coating is polytetrafluoroethylene (TEFLON).

BRIEF DESCRIPTION OF THE DRAWINGS

The present invention is best described by reference to the appended drawings showing an embodiment of the invention, wherein:

FIG. 1 is a plan elevation view showing the layout plan of the heating conductor for two continuous heating surfaces;

FIG. 1a detailed showing of the connecting web of FIG. 1;

FIG. 2 is a cross-sectional view of a bracing wire inserted through an apron brought into connection with a second bracing wire disposed in the bracing trough of the padding core; and FIG. 2a is a detailed showing of a portion of FIG. 2.

DESCRIPTION OF THE PREFERRED EMBODIMENTS

With particular reference to FIG. 1 it is shown that the surfaces of the seat and backrest are made heatable by a meander-form heating conductor disposed between two layers of the textile material, the two heating surfaces 2 and 3 being marked in the region of their division, in the case of this example, by four large perforations 6.2 distributed over the width. The intermediate space between the perforations 6.2, including the equal edge regions on both sides, defines connecting bridges 6 which in conjunction with support fabric 10.3 secured to the covering material 5.3, as shown in FIG. 2, are used as bracing aprons.

The respective second connecting bridge, seen from the edge of the width dimension, is the support for the connecting webs 4.0. These webs are directed laterally inverted with respect to each other at angles which are about 60° and lead from their end borders in each case over about 25 mm into the surfaces to be heated where they bear in each case on the outwardly lying meander-shaped heating loops.

It has been found convenient for the heating loops of the two surfaces 2 and 3 to extend at right angles to each other as shown in FIG. 1.

The heating conductor sections 4.2 laid in wave manner and covered on both sides by knitted or woven copper strip 4.1 form together with the textile layers in each case a relatively wide connecting web 4.0. Through the bracing apron shown in FIG. 2 and formed in constrained manner by the perforations in conjunction with the support fabric 10.3 connected to the cover material 5.3 via a seam 10.1 a bracing wire 6.1 is led. Bracing wire 6.1 is secured by clips 6.3 to bracing wire 5.1 therebelow fixed in the padding 5.

The openings to the bracing wire 5.1 arranged in the bottom of the bracing trough 5.2 correspond to the arrangement of the clips 6.3 so that in simple manner the connection can be established between the two bracing wires 5.1 and 6.1.

The configuration of the connecting webs 4.0 and their arrangement permit large elongations to be taken up. As shown in FIG. 2 a foam layer 5.4 is disposed between the lower side of covering material 5.3 and seam 10.1. The foam layer 5.4 is directed towards the padding core 5 and presses heated surfaces 2 and 3 against the surface of the padding core.

The heated surfaces 2 and 3 have electrical terminals 1 and 1a.

Finally, for a better understanding of the present invention attention is drawn to the overall structure of the continuous heating surfaces 2 and 3. The two heating surfaces 2 and 3 are separated only by the perforations 6.2 and as already mentioned the intermediate spaces in conjunction with the support fabric 10.3 form the actual bracing apron. The conductors of the two surfaces 2 and 3 are in accordance with the layout plan laid on a needle template initially receiving the textile lower side 10.2 and are connected to the textile upper side 10.1 by a hot ironing method. As already mentioned beneath the covering material 5.3 the foam layer 5.4 is disposed and over the laid out heating conductors. The conductors are thereby directed against the padding core 5. The total heating body 10 is provided with the electrical terminals 1 and 1a, the reference 11 representing a safety thermostat.

What we claim is:

1. In heat conductor connections between electrical heating elements located in seat and backrest surfaces having a padded core, said surfaces separated by a bracing trough provided in said padded core, a first bracing wire bonded into said padded core beneath said bracing trough, said first bracing wire exposed in sections by window-like recesses in said bracing trough, covering materials on said surfaces having a second bracing wire, an insert loop connecting said first and second bracing wires, the improvement comprising:

connecting webs between said seat and backrest comprising woven or knitted copper bands and connecting heating conductor sections laid in a meander or wave form bearing on said copper bands and connecting said heating elements wherein said connecting webs (4.0) each consist of a two-layer copper strip (4.1) and said heating conductor sections (4.2) are freely movable between the two layers.

2. The heating conductor connections of claim 1, wherein said bracing trough defines the edge boundaries of said surfaces (2/3) and said connecting webs (4.0) are laid at an angle between 30° and 60° laterally inverted with respect to each other and matched in their length so that the ends of the connecting webs (4.0) engage at least about 20 mm on both sides of said bracing trough (5.2)

3. The heating conductor connections of claim 1, wherein said heating conductor sections (4.2) bearing on said connecting webs (4.0) and laid in wave or meander form are fixed at least at their reversal points to be frictionally displaceable and that said condutor sections have non-adhering coatings.

4. The heating conductor connections of claim 3, wherein said non-adhering coatings consist of polytetrafluoroethylene.

* * * * *